United States Patent [19]
Seki

[11] Patent Number: 5,371,664
[45] Date of Patent: Dec. 6, 1994

[54] LINE-COMMUTATED AND SELF-COMMUTATED COMBINED POWER CONVERSION SYSTEM

[75] Inventor: Nagataka Seki, Tokyo, Japan

[73] Assignee: Kabushiki Kaisha Toshiba, Kawasaki, Japan

[21] Appl. No.: 971,157

[22] Filed: Nov. 4, 1992

[30] Foreign Application Priority Data

Nov. 11, 1991 [JP] Japan ................. 3-294059
Dec. 24, 1991 [JP] Japan ................. 3-339202

[51] Int. Cl.5 ........................................ H02H 7/12
[52] U.S. Cl. ........................................ 363/51; 363/54; 363/58; 323/207
[58] Field of Search ............ 307/105; 323/207; 363/35.51, 54, 58; G05F 1/70

[56] References Cited

U.S. PATENT DOCUMENTS

| | | | |
|---|---|---|---|
| 3,609,508 | 9/1971 | Gusakovsky et al. | 363/51 |
| 4,346,421 | 8/1982 | Gurr | 363/58 |
| 4,379,325 | 4/1983 | Krampe et al. | 363/35 |
| 4,721,897 | 1/1988 | Matsuse et al. | 363/58 |

FOREIGN PATENT DOCUMENTS

| | | | |
|---|---|---|---|
| 0042715 | 2/1989 | Japan | G05F 1/70 |
| 0813587 | 3/1981 | U.S.S.R. | 323/207 |
| 1119120 | 10/1984 | U.S.S.R. | 323/207 |

Primary Examiner—Jeffrey L. Sterrett
Attorney, Agent, or Firm—Foley & Lardner

[57] ABSTRACT

The power conversion system of this invention comprises line-commutated power converting means in which a line-commutated power conversion circuit that performs line-commutated commutation and a coupling diode are coupled to form a DC circuit and for converting DC power into AC power or AC power into DC power. Further, the system comprises self-commutated power converting means, in which a self-commutated power conversion circuit is coupled to the coupling diode in order to form a DC circuit and for reducing reactive power, or the reactive power and harmonics generated by the line-commutated converting means. Accordingly, their respective strengths can be made use of and their mutual weaknesses can complement each other.

4 Claims, 9 Drawing Sheets

LINE-COMMUTATED AND SELF-COMMUTATED COMBINED POWER CONVERSION SYSTEM

BACKGROUND OF THE INVENTION

1. Field of the Invention

The invention relates to a power conversion system in which a line-commutated power conversion system and a self-commutated power conversion system are coupled.

2. Description of the Related Art

Line-commutated power conversion systems are widely used for conversion from AC power to DC power or from DC power to AC power. By way of example, large-scale systems are used in power conversion systems for DC power transmission.

However, large-scale line-commutated power conversion systems require LC filters, consisting of a reactor and a capacitor, in order to reduce harmonics and compensate for lagging reactive power. In addition to the problem that the space required for the LC filter is large, there are problems of overcurrent in the LC filter caused by the ingress of harmonics from the outside, the occurrence of antiresonance caused by the LC filter and the reactance of the system.

Further, in line-commutated conversion systems, a switching device is commutated using the system voltage. So, there is also a problem in that commutation fails and the system damaged if the voltage of the system should drop or voltage distortion occur during inverter operation.

Active filters and reactive power adjusting devices using voltage type self-commutated power conversion systems, instead of LC filters, have recently appeared, together with advances in self-commutated power conversion technology.

By way of examples, active filters and reactive power adjusting devices, products classed from several MVA to several tens of MVA, have been produced, starting with the device disclosed in the "Toshiba Review" (Vol. 43, No. 4, pp. 339 to 342) for example. The power conversion circuit is of the voltage type, self-commutated type. The primary problem in systems using this voltage type, self-commutated power conversion system is overcurrent protection in the switching device during a DC short-circuit.

The problems associated with a main circuit become particularly apparent at higher capacities. To elaborate, should the GTO (Gate Turn-Off) thyristors be ON at the same time due to a control irregularity or the like, the charge of the DC capacitor is discharged through the GTO thyristors. If there is a rapid rise in the short-circuit current, it is impossible to use the current circuit-breaking function of the GTO thyristor at this time, and there is a risk of overcurrent breakdown of the GTO thyristor. Protective fuses are inserted to prevent the risk.

However, protective fuses are not available for higher voltages and some customers do not like to use them for reasons of guaranteeing long-term reliability. There is a demand for devices to replace them.

SUMMARY OF THE INVENTION

It is, therefore, an object of the invention to provide a power conversion system comprising a line-commutated power converter and a self-commutated power converter, wherein their respective strengths can be made use of and their respective weaknesses can be complemented by each other.

To achieve the above object, a power conversion system comprising line-commutated power converting means in which a line-commutated power conversion circuit and a coupling diode are coupled to form a DC circuit and for converting DC power into AC power or AC power into DC power, and self-commutated power converting means in which a self-commutated power conversion circuit is coupled to the coupling diode in order to form a DC circuit and for reducing reactive power, or the reactive power and harmonics generated by the line-commutated converting means.

According to the above-structured power conversion system of the invention, the line-commutated power converting means governs the power conversion from DC power to AC power or from AC power to DC power and the self-commutated power converting means reduces the reactive power, or the reactive power and harmonics generated by the line-commutated power converting means. Both operate more or less independently, but during the rare direct current short-circuiting of the self-commutated power converting means, conduction by the coupling diode is blocked so that the line-commutated power converting means and the self-commutated power converting means operate in series. Thus the overcurrent in the self-commutated power converting means side is limited by the constant current control function of the line-commutated power converting means and the short-through is safely removed by the turn-off action of the switching devices by the intrinsic circuit-breaking function. This makes it possible to make self-commutated power converting means fuseless and smaller in scale.

DETAILED DESCRIPTION OF THE PREFERRED EMBODIMENTS

Preferred embodiments of the invention will now be described, referring to the accompanying drawings.

Figure 1:
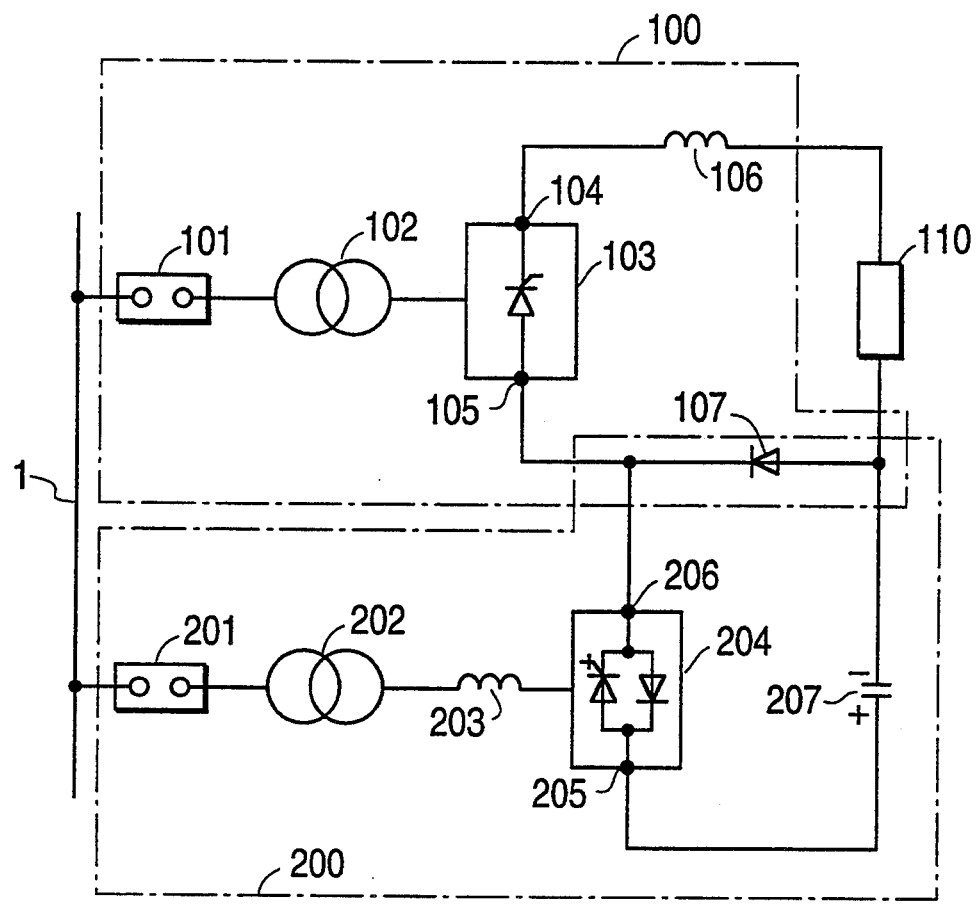
FIG. 1 is a diagram of a power conversion system illustrating a first embodiment of the invention.

As shown in FIG. 1, a power conversion system of a first embodiment comprises a line-commutated power conversion apparatus 100 and a voltage type self-commutated power conversion apparatus 200. Both apparatus 100 and 200 are coupled by a coupling diode 107.

The line-commutated power conversion apparatus comprises a circuit breaker 101, a transformer 102, a reverse blocking type bridge connected power converter 103 having a positive terminal 104 and a negative terminal 105, a DC reactor 106 and the coupling diode 107.

The voltage type self-commutated power conversion apparatus 200 comprises a circuit breaker 201, a transformer 202, a coupling reactor 203, a reverse conducting type bridge connected power converter 204 having a positive terminal 205 and a negative terminal 206, a DC capacitor 207 and the coupling diode 107.

Figure 2:
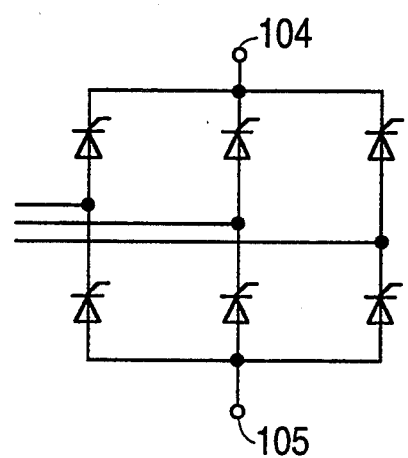
FIG. 2 is a diagram illustrating one example of a reverse blocking type bridge connected converter.

Further, the reverse blocking type bridge connected power converter 103 may be a thyristor rectifier as shown in FIG. 2.

As the coupling diode 107 is connected in the direction of DC current flow, the normal operation of the line-commutated power conversion apparatus 100 is not influenced by the coupling diode 107.

On the other hand, as the coupling diode 107 is inserted with the polarity in FIG. 1 in the voltage type self-commutated power conversion apparatus 200, the capacitor 207 is charged, but there is no pathway for discharging in the voltage type self-commutated power conversion apparatus 200.

Consequently the voltage type self-commutated power conversion apparatus 200 does not operate alone. However, if the line-commutated power conversion apparatus 100 is operated and a current $I_1$ flows in the coupling diode 107, the voltage type self-commutated power conversion apparatus 200 operates in exactly the same way as when there is no coupling diode provided that the current in the discharge direction flowing in the DC capacitor 207 is less than the current $I_1$.

However, if for some reason the reverse conducting type bridge connected power converter 204 suffers commutation failure, the terminals 205 and 206 are short-circuited, and the charge of the capacitor 207 attempts to flow through the short-circuit path. Further if this value is about to exceed the current $I_1$, the current in the coupling diode 107 is zero and the coupling diode 107 enters the reverse blocking state.

Figure 3:
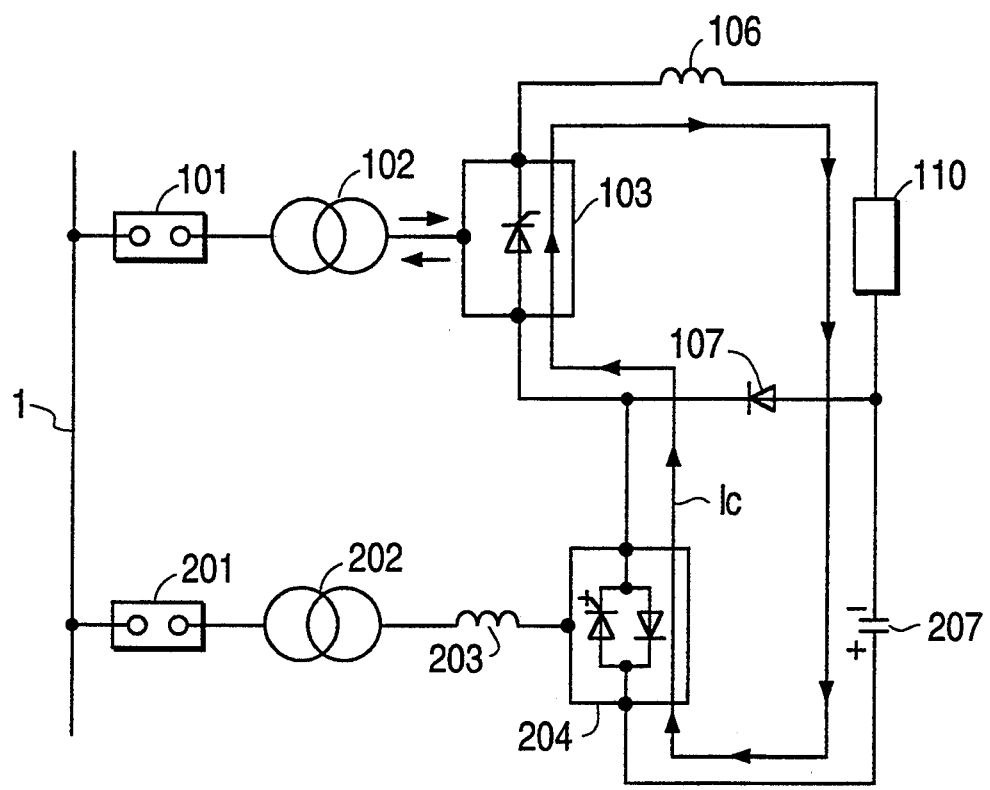
FIG. 3 is a diagram showing paths along which current flows during DC short-circuiting of the reverse conducting type bridge connected converter.

As result, as shown in FIG. 3, the discharge current $I_c$ flows through the circuit of the line-commutated power conversion apparatus 100 and the increase in current is restricted. Subsequently, a protective operation is carried out by a signal from a commutation failure detection circuit (not shown). The commutation failure detection circuit protects the power conversion system from the overcurrent caused by the commutation failure. Further, a choice is made, depending on the cause of the commutation failure, whether to restart the operation or to stop the voltage-type self-commutated power conversion apparatus 200 and only operate the line-commutated power conversion system 100, so preventing a drop in the working efficiency of the power conversion system.

Now the operation of protecting the reverse conducting type bridge connected power converter 204 will be described.

Figure 4:
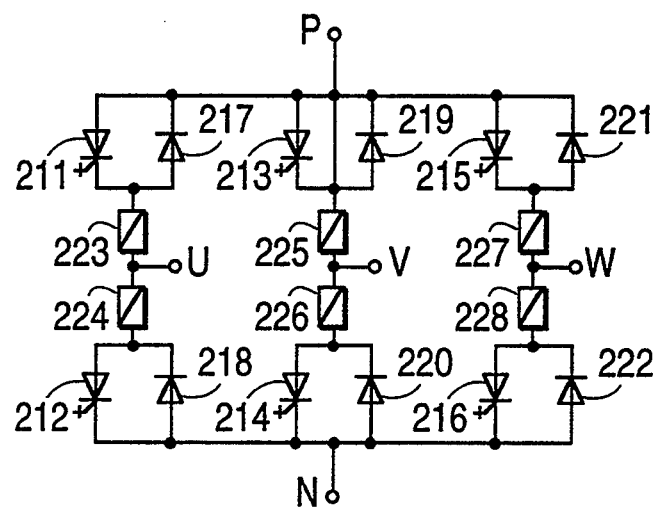
FIG. 4 is a diagram illustrating one example of a reverse conducting type bridge connected converter.

Referring to FIG. 4, when the GTO thyristors 211, 214 and 216 are fired, currents $I_U$, $I_V$ and $I_W$ flow into terminals U, V and W respectively. If current $I_W$ is flowing, and the GTO thyristor 215 is fired by accident, a DC short-circuit occurs between the GTO thyristor 215 and the GTO thyristor 216.

As described above, as the current $I_1$ flows through the point of short-circuit, the current $I_1$ flows into the GTO thyristor 215 and the currents $I_W$ and $I_1$ flow into the GTO thyristor 216. If the maximum current value at which the GTO thyristor can be turned off by its gate is $I_{TGQ}$ and the value of current $I_W$ plus current $I_1$ is equal to $I_{TGQ}$ or less, the GTO thyristor can be provided with an OFF signal and can be turned off safely. However, if the value of current $I_W$ plus current $I_1$ is more than the $I_{TGQ}$ and the GTO thyristor is provided with the OFF signal, it will be destroyed due to overcurrent. Accordingly, for safe operation, the current $I_1$ must satisfy the following expression.

$$I_W + I_1 \leq I_{TGQ}$$

Consequently, if the GTO thyristors 215 and 216 are turned off, the short-circuit is removed. The GTO thyristor 216 can then also be turned off safely and the system can be restarted immediately.

A method of providing an ON signal to other GTO thyristors at phases which do not short-circuit at the same time after detecting the short-circuited condition as a method of decreasing the current value flowing in a short-circuited portion.

Next a second embodiment will be described with reference to FIG. 5.

Figure 5:
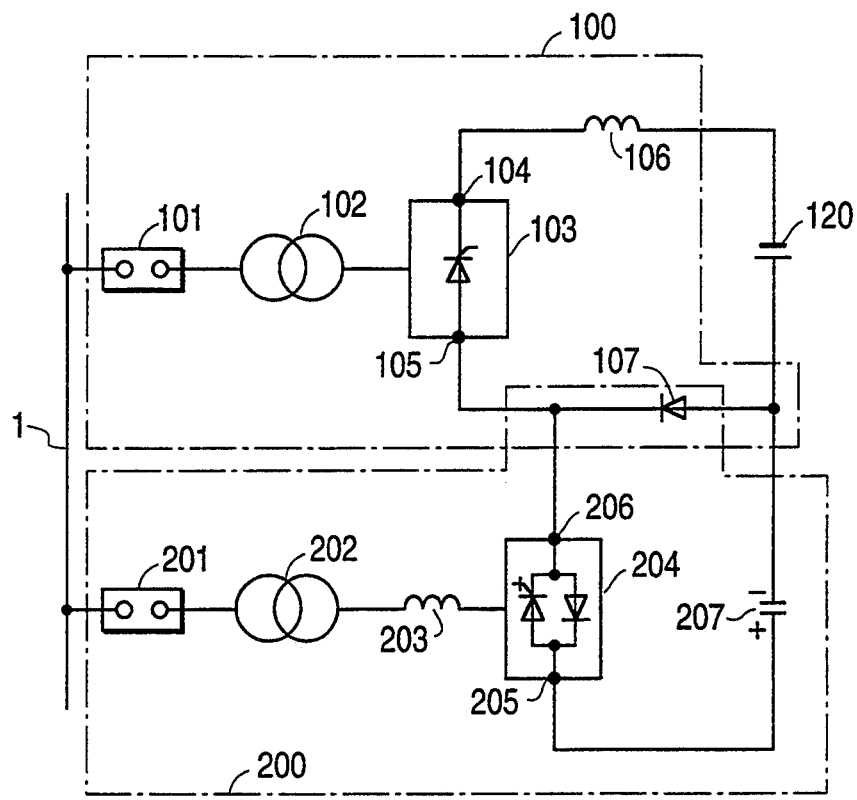
FIG. 5 is a diagram of a power conversion system illustrating a second embodiment of the invention.

As shown in FIG. 5, in this embodiment a DC power source 120 has been connected instead of the load. The line-commutated power conversion apparatus 100 freely converts from AC to DC and from DC to AC by changing the firing control angle of the thyristor.

Next a third embodiment will be described with reference to FIG. 6.

Figure 6:
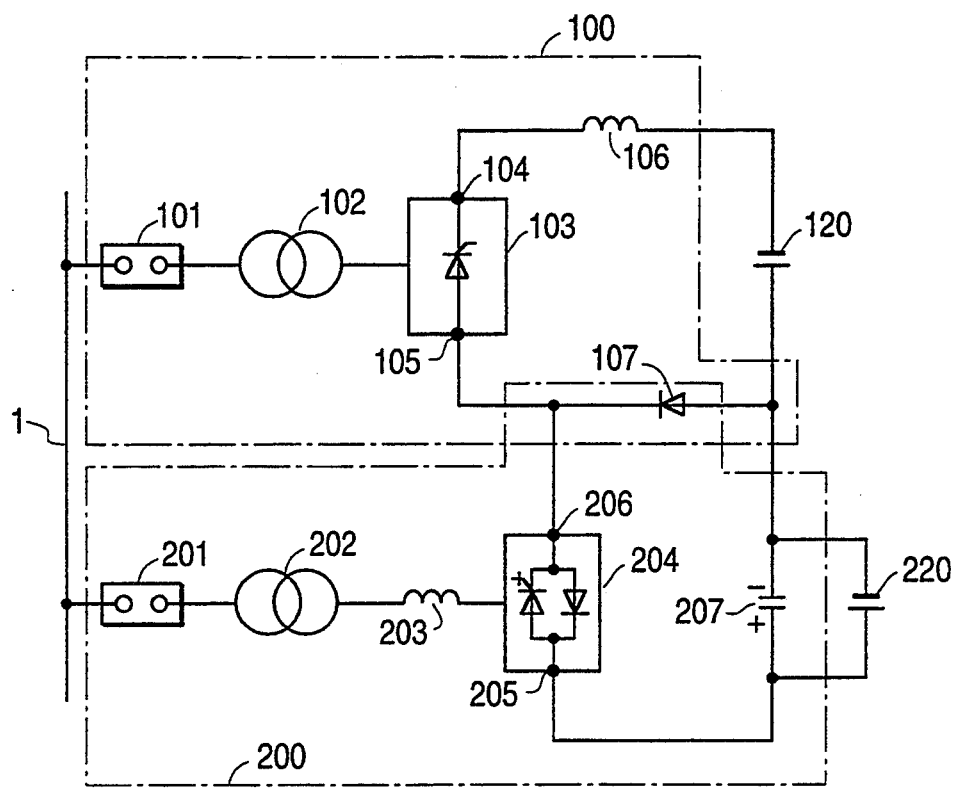
FIG. 6 is a diagram of a power conversion system illustrating a third embodiment of the invention.

A voltage type self-commutated power conversion apparatus in FIG. 6 also has the function of reducing harmonics as well as the function of adjusting reactive power while supplying active power to the system by converting DC power to AC power.

The power conversion system shown in FIG. 1, FIG. 5 and FIG. 6 have various other alternatives. The embodiments shown below illustrate alternatives of the power conversion system in FIG. 1, but similar alternatives are also possible for the power conversion systems in FIG. 5 and FIG. 6.

Figure 7:
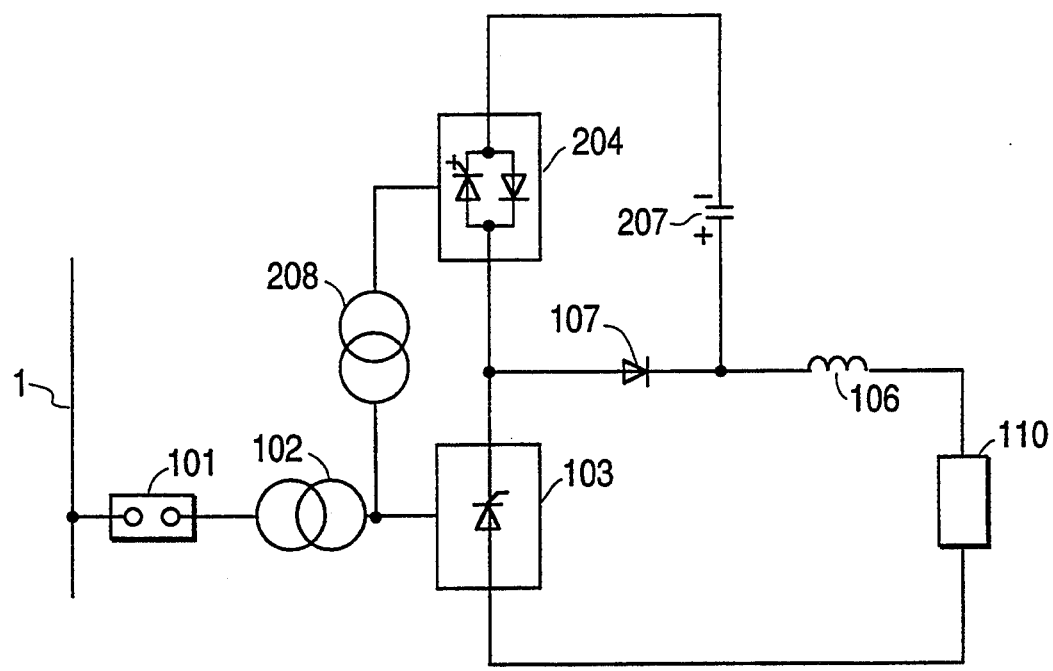
FIG. 7 is a diagram of a power conversion system illustrating a fourth embodiment of the invention.

FIG. 7 shows a fourth embodiment of the invention.

This embodiment shows that the position where the coupling diode 107 is inserted can be varied freely in the closed circuit constituted by the reverse blocking type bridge connected power converter 103, DC reactor 106, load 110, and the coupling diode 107 in the power conversion system in FIG. 1. It also shows that the function of coupling reactor 203 is included in the leakage reactance of transformer 208 and the function of circuit breaker 201 is included in the circuit breaker 101.

Also in this system the transformer 208 is connected to the DC winding side of the transformer 102. This allows the frequency of occurrence of commutation failure in the line-commutated power conversion apparatus to be reduced as far as possible by preventing the system voltage from falling due to reactive power supplied by the voltage type self-commutated power conversion apparatus and reducing the distortion of the system voltage by a harmonic reducing function. However, in this case, leakage reactance of the transformer is set at a low level. Of course, it is possible to reduce the frequency of commutation failure and the like as well, but this depends on the sizes and proportions of the impedance of the transformer 102 and the impedance on the system side.

Large capacity systems require duplication of the reverse conducting type bridge connected power converter 204. A fifth embodiment through a seventh embodiment are shown in FIG. 8 to FIG. 10.

Figure 8:
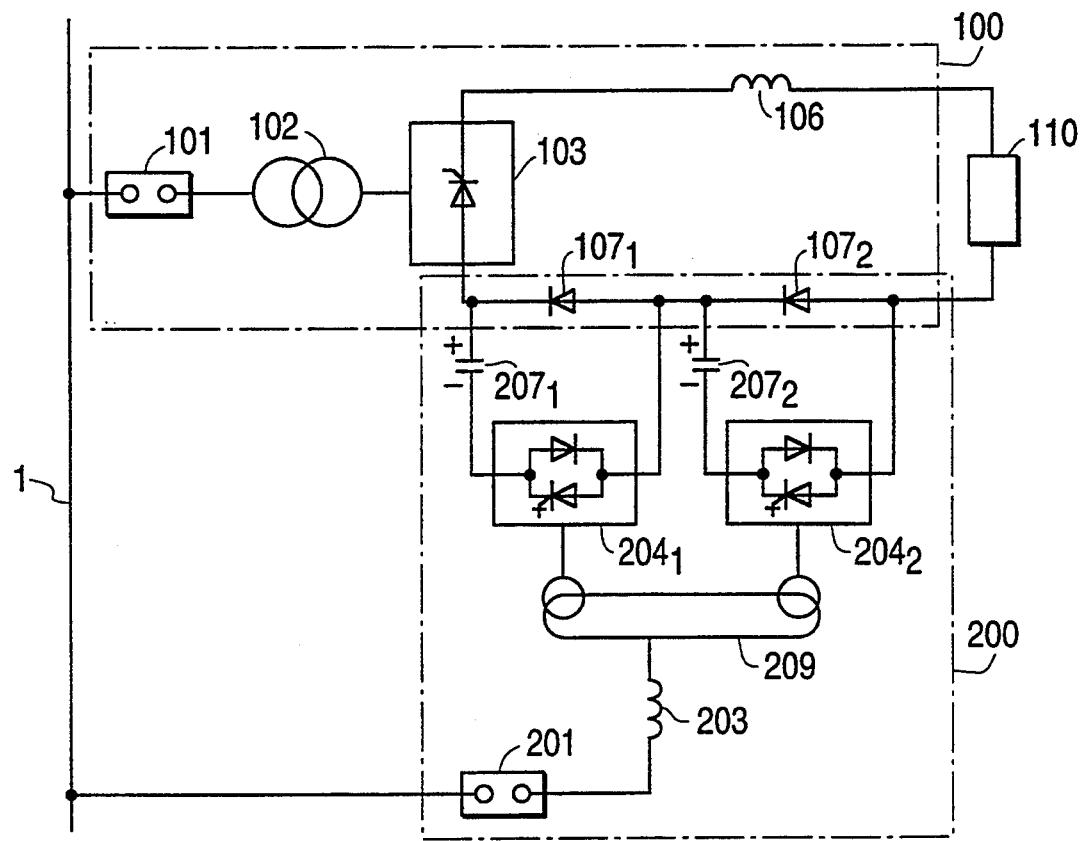
FIG. 8 is a diagram of a power conversion system illustrating a fifth embodiment of the invention.

In the fifth embodiment in FIG. 8, two coupling diodes 107 are inserted in series, and series circuits, consisting of reverse conducting type bridge connected power converters 2041 and 2042 and DC capacitors 2071 and 2072, are connected to these with the polarity depicted. Waveform synthesis with a transformer 209 using two reverse conducting type bridge connected converters in this way is a technique generally widely used for duplicate inverters. Even if one of the reverse conducting type bridge connected power converters 2041 or 2042, or both, causes a DC short circuit, the conduction of one or both of the coupling diodes 1071 or 1072 is blocked as in FIG. 1, the line-commutated power conversion apparatus 100 and the voltage type self-commutated power conversion apparatus 200 are connected in series and it proves possible to move the protection operation while the rise in the short circuit current is limited.

Figure 9:
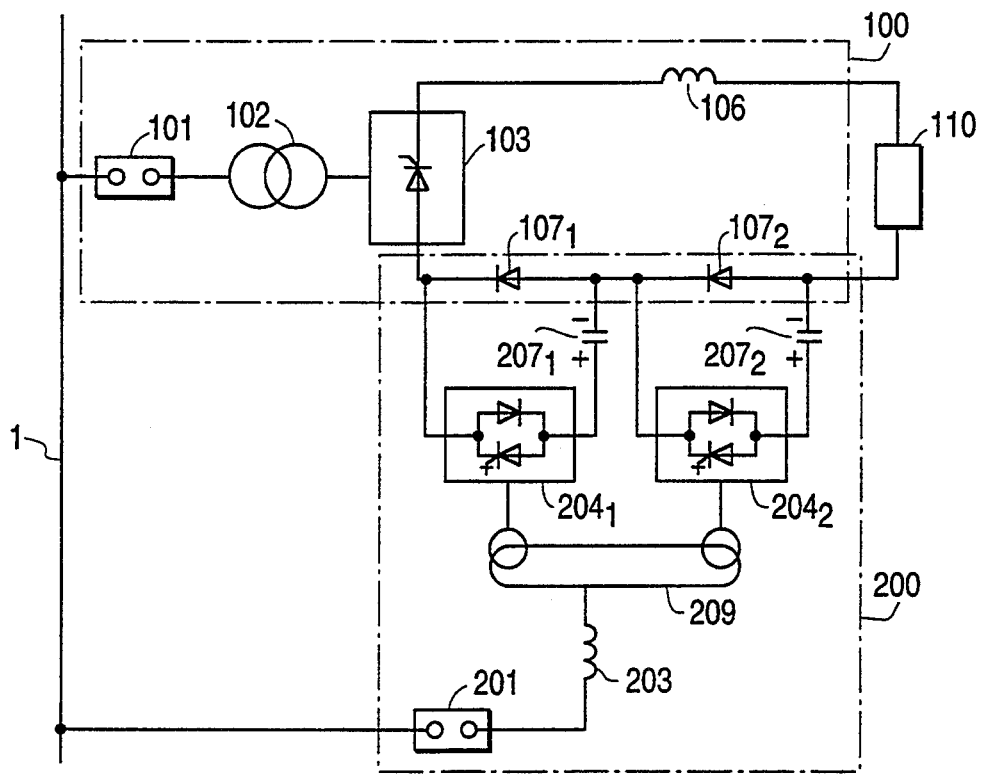
FIG. 9 is a diagram of a power conversion system illustrating a sixth embodiment of the invention.

In the sixth embodiment in FIG. 9, the positional relationship between the DC capacitor 207 and the reverse conducting type bridge connecter power converter 204 has been reversed. Coupling reactor 203 may be inserted on the AC winding side of the transformer as in FIG. 9, or it can be inserted in the DC winding side as in FIG. 1, or omitted if a high-impedance transformer is used.

Figure 10:
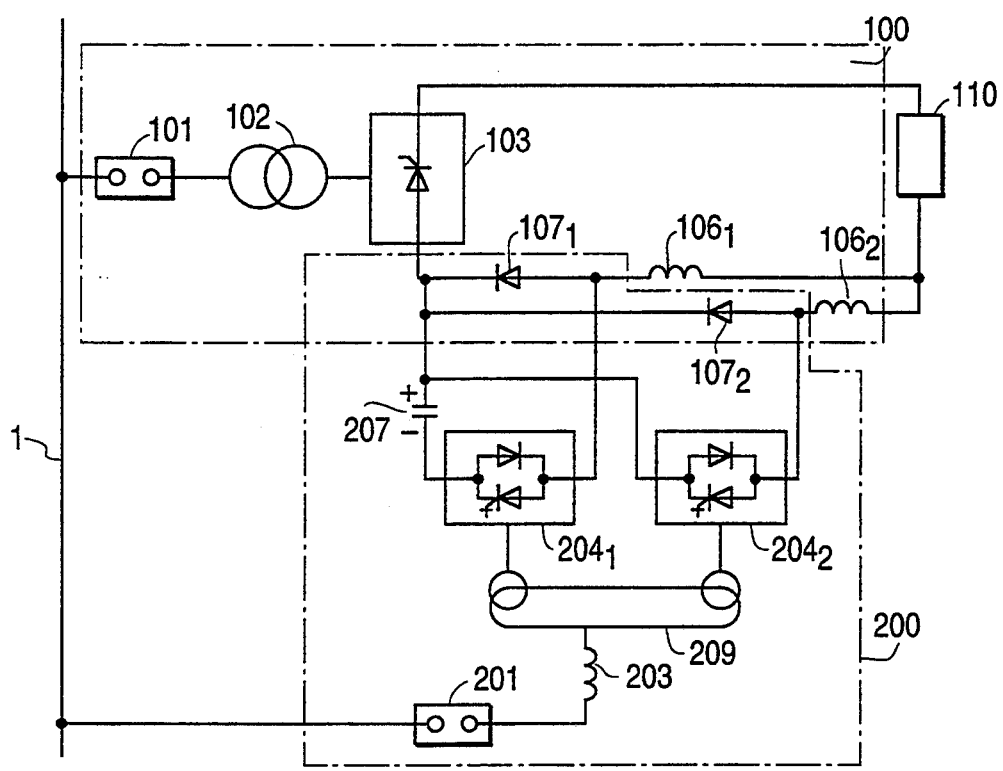
FIG. 10 is a diagram of a power conversion system illustrating a seventh embodiment of the invention.

The seventh embodiment in FIG. 10 is effective in large capacity power conversion systems. As in FIG. 8, a plurality of serial circuits consisting of a DC reactor 106 and coupling diode 107 are connected in parallel, and a reverse conducting type bridge connected power converters 204 and DC capacitors 207 are connected to the coupling diodes. In this case, too, the DC capacitors may be divided as in FIG. 8 and FIG. 9.

The insulating transformers 102, 202 and 209 in the embodiments in FIG. 1 to FIG. 10 are used normally when connected to the system. It is clear that there is no need to provide insulating transformers in both the line-commutated power conversion apparatus 100 and the voltage type self-commutated power conversion apparatus 200, although, in principle, the AC side must be insulated since the two apparatuses are coupled by the coupling diode 107 in the direct current portion.

Examples have been given in the preceding description in which the voltage type self-commutated power conversion apparatus has been used as a reactive power adjusting device, active filter or inverter, but it is clear that, in principle, it can also be used to convert from AC power to DC power. In addition to the device commutation power converter shown in FIG. 4, a converter using impulse commutation type or another type self-commutated power conversion apparatus can be appropriately used as the reverse conducting type bridge connected power converter.

Next an eighth embodiment of this invention will be described with reference to FIG. 11.

Figure 11:
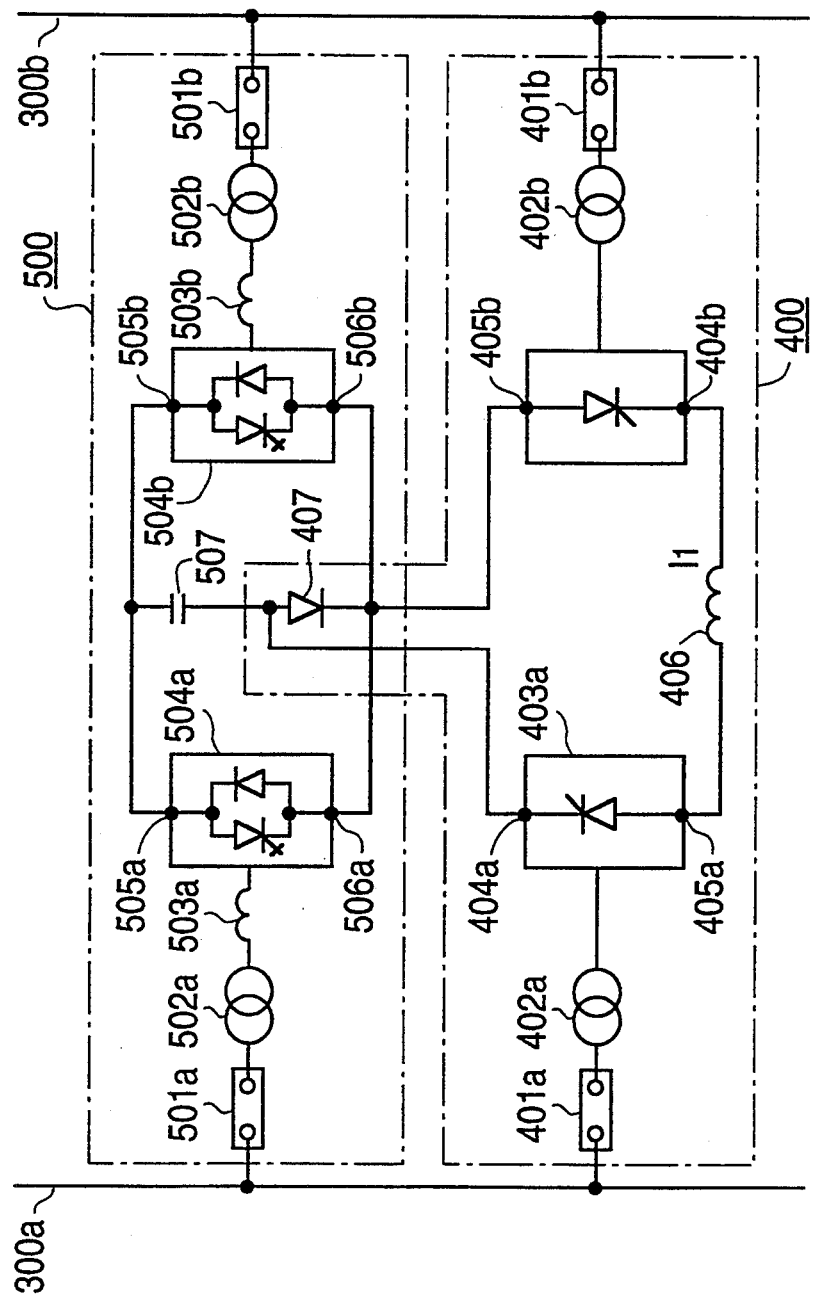
FIG. 11 is a diagram of a power conversion system illustrating a eighth embodiment of the invention.
Figure 12:
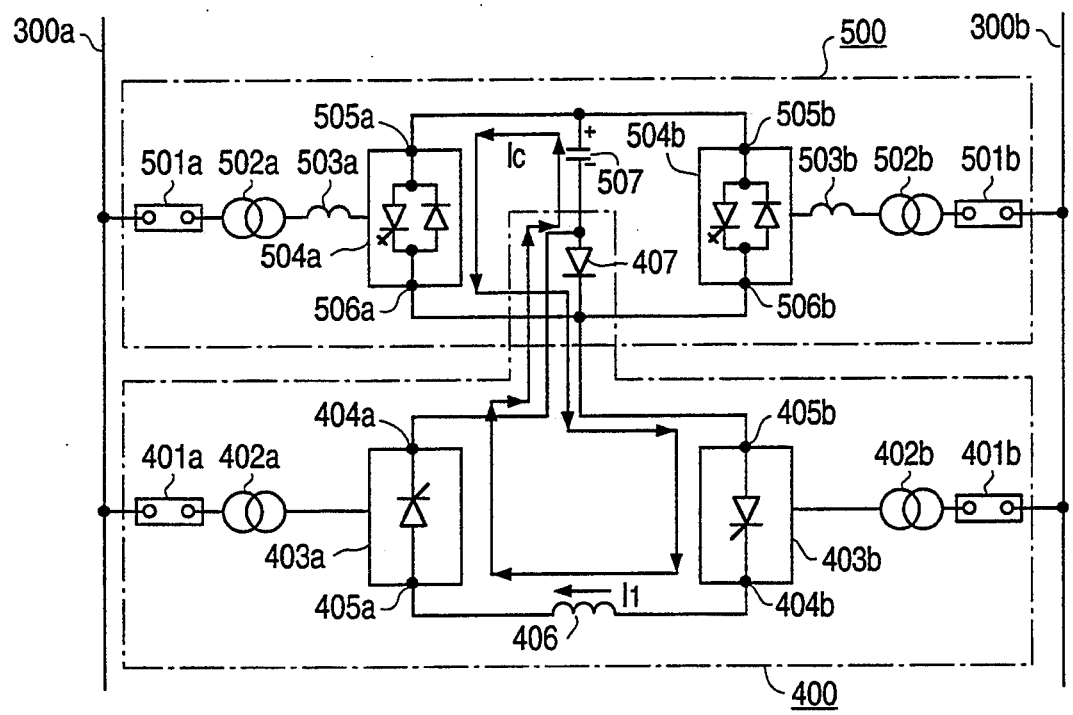
FIG. 12 is a diagram showing paths along which current flows during DC short-circuiting of a reverse conducting type bridge connected converter of the eighth embodiment in FIG. 11.

A power conversion system of this embodiment as shown in FIG. 11 comprises a first AC line 300a, a second AC line 300b, a line-commutated power conversion apparatus 400, a self-commutated power conversion apparatus 500. The interiors of line-commutated power conversion apparatus 400 and self-commutated power conversion apparatus 500 are symmetrical as between the side associated with AC line 300a and the side associated with AC line 300b. The reference numerals of the constituent devices are therefore distinguished by suffixes a and b.

The power source terminals of circuit breakers 401 and 501 are respectively connected to AC lines 300a and 300b. The load terminal of circuit breaker 401 is connected to the input terminal of a transformer 402 and the load terminal of circuit breaker 501 is connected to the input terminal of a transformer 501.

The output terminal of transformer 402 is connected to the AC terminal of a reverse blocking type bridge connected power converter 403 while the output terminal of transformer 502 is connected to the AC terminal of a reverse conducting type bridge connected power converter 504 through a reactor 503.

The reverse blocking type bridge connected power converter 403 has a positive electrode terminal 404 and a negative electrode terminal 405.

The negative electrode terminal 405 and one end of reactor 406 are connected. The positive electrode terminal 404 and the anode of a coupling diode 407 are connected. The positive electrode terminal 404 is connected to the other end of reactor 406. The cathode of coupling diode 407 is connected to the negative electrode terminal 405 of reverse blocking type bridge connected power converter 403, forming a pair.

A series circuit consisting of a DC capacitor 507 and coupling diode 407 is connected between positive electrode terminal 505 and negative electrode terminal 506 of reverse conducting type bridge connected power converter 504 with a polarity such as to block discharge of DC capacitor 507.

The operations of the line-commutated power conversion apparatus 400 and Self-commutated power conversion apparatus 500 are the same as the operations described in the first embodiment. Consequently the operations are not described in this embodiment in detail.

However, if for some reason there is a failure of commutation of the reverse conducting type bridge connected power converter 504a on the side of AC line 300a, when terminals 505a and 506a go into a short-circuited condition, the discharge current of DC capacitor 507 tries to flow through the short-circuit with the result that its value tries to exceed $I_1$. However, when this happens, the current of coupling diode 407 goes to zero, so that coupling diode 407 goes into a blocking condition.

Figure 13:
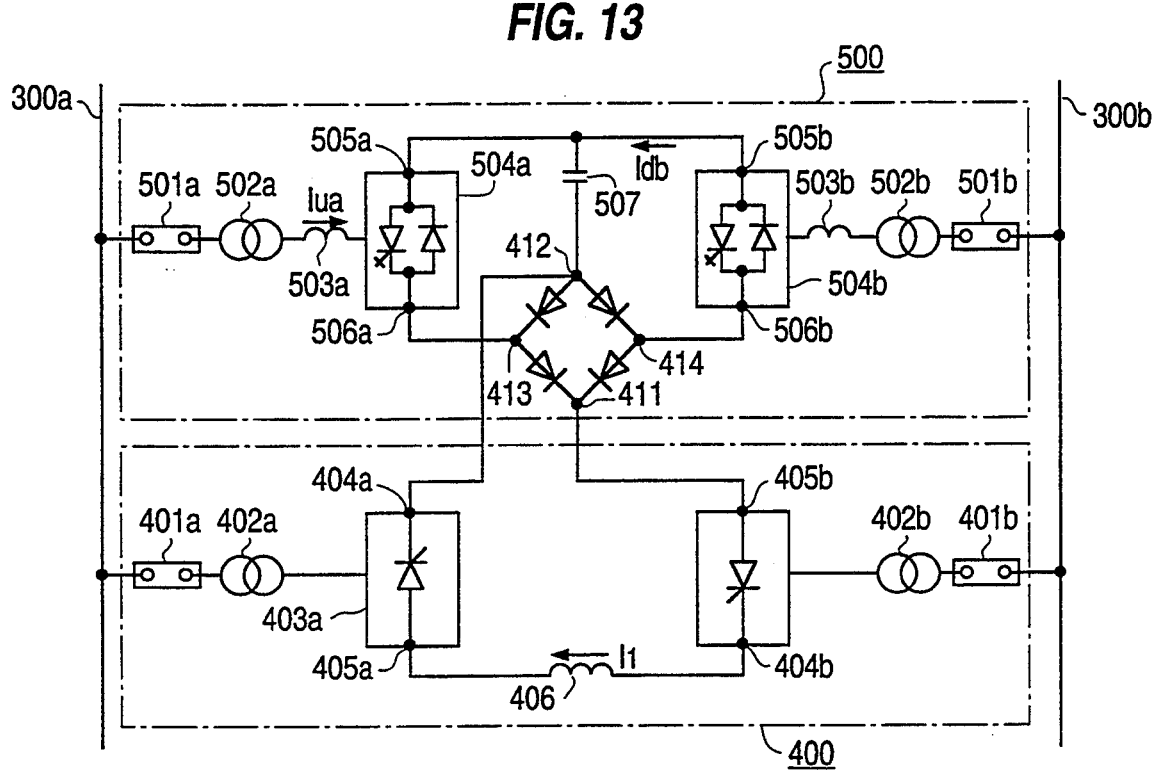
FIG. 13 is a diagram of a power conversion system illustrating a ninth embodiment of the invention.

As a result, as shown in FIG. 13, in which identical parts to those of FIG. 11 are given the same reference numerals, discharge current $I_c$ flows through the circuit of line-commutated power conversion apparatus 400 which suppresses this discharge current $I_c$ to $I_1$. The GTO thyristor of the properly functioning reverse conducting type bridge connected power converter 504b is, therefore, turned off by a signal generated by a commutation failure detection circuit (not shown). An OFF signal is simultaneously supplied to the GTO thyristor of the faulty reverse conducting type bridge connected power converter 504a.

The difference between this embodiment and the embodiment described in FIG. 1 is a current value flowing in the short-circuit portion.

Though the current value is the value $I_1+I_m$ in the embodiment described in FIG. 1, the current value in this embodiment is the value $I_1+I_m+I_{db}$. $I_{db}$ is a direct current flowing through the reverse conducting type bridge connected power converter 504b.

Consequently the current value described in this embodiment raises two possibilities due to the direction of flow of the direct current. One is that the current value is larger than the value $I_1+I_m$ and the other is that it is lower than the value $I_1+I_m$.

It may be selected whether the operation of the reverse conducting type bridge connected power converter 504b stops or not at the same time to short-circuit in order to decrease the current flowing at the short-circuit portion as large as possible.

Also, in case of the embodiment of FIG. 11, it is effective to turn on all of GTO thyristors in the reverse conducting type bridge connected power converter which short-circuited and to disperse the short-circuit current.

FIG. 13 is a diagram showing a ninth embodiment of this invention. Its difference from FIG. 11 is that a single-phase diode bridge 410 is employed for coupling, instead of coupling diode 407. The single-phase diode bridge 410 has DC terminals 411 and 412 and AC terminals 413 and 414. Ordinary operation in this case is the same as in FIG. 11.

Considering the case where short-circuit occurs in the ux pole of reverse conducting bridge connected converter 504a as in FIG. 11, entry of the DC current $I_{db}$ of reverse conducting type bridge connected power converter 504b is blocked by single-phase diode bridge 410, so the GTO thyristor current of the ux pole becomes $I_{ua}+I_1$ while the other GTO thyristor currents are $I_1$. A selective turn-off procedure can be adopted, so long as $I_{TGQ}>I_1$, $I_1$ can be greater than in FIG. 11. The ux pole means the portion constituted in the bridge connected circuit of FIG. 4 by GTO thyristors 211 and 212, diodes 217 and 218 and fuses 223 and 224, and forms one phase.

Figure 14:
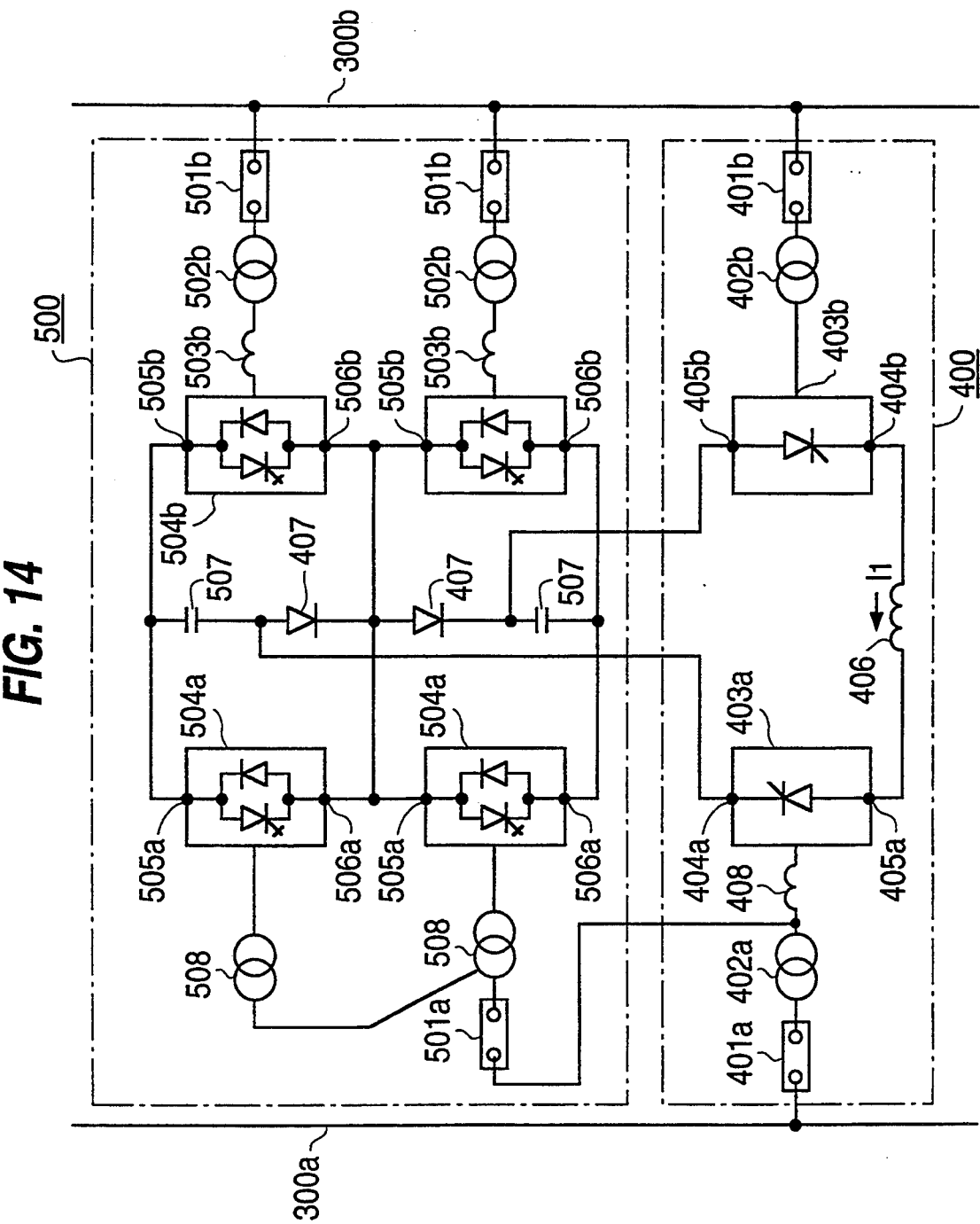
FIG. 14 is a diagram of a power conversion system illustrating a tenth embodiment of the invention.

FIG. 14 shows a tenth embodiment of this invention. In this embodiment, two self-commutated power conversion apparatuses as in FIG. 11, are provided.

Further, in this embodiment, coupling reactor 503a and transformer 502a are integrated and substituted by high-inductance transformers 508. The primary windings of two high-inductance transformers 508 are connected in series. Voltage composition using a transformer is often carried out, in order to reduce waveform distortion on the AC side of a plurality of reverse conducting type bridge connected power converters 504 in a voltage type self-commutated power converter.

Circuit-breaker 501a is connected to the secondary side of transformer 402a of line-commutated power conversion apparatus 400. A reactor 408 is inserted between this secondary side and reverse blocking type bridge connected power converter 403a. This is provided with the aim of decreasing outflow of higher harmonic current to the system and reducing the frequency of commutation failure of reverse blocking type bridge connected power converter 403a, by reducing the voltage drop generated in AC line 300a and the higher harmonics generated by reverse blocking bridge connected converter 403a in self-commutated power conversion apparatus 500.

Figure 15:
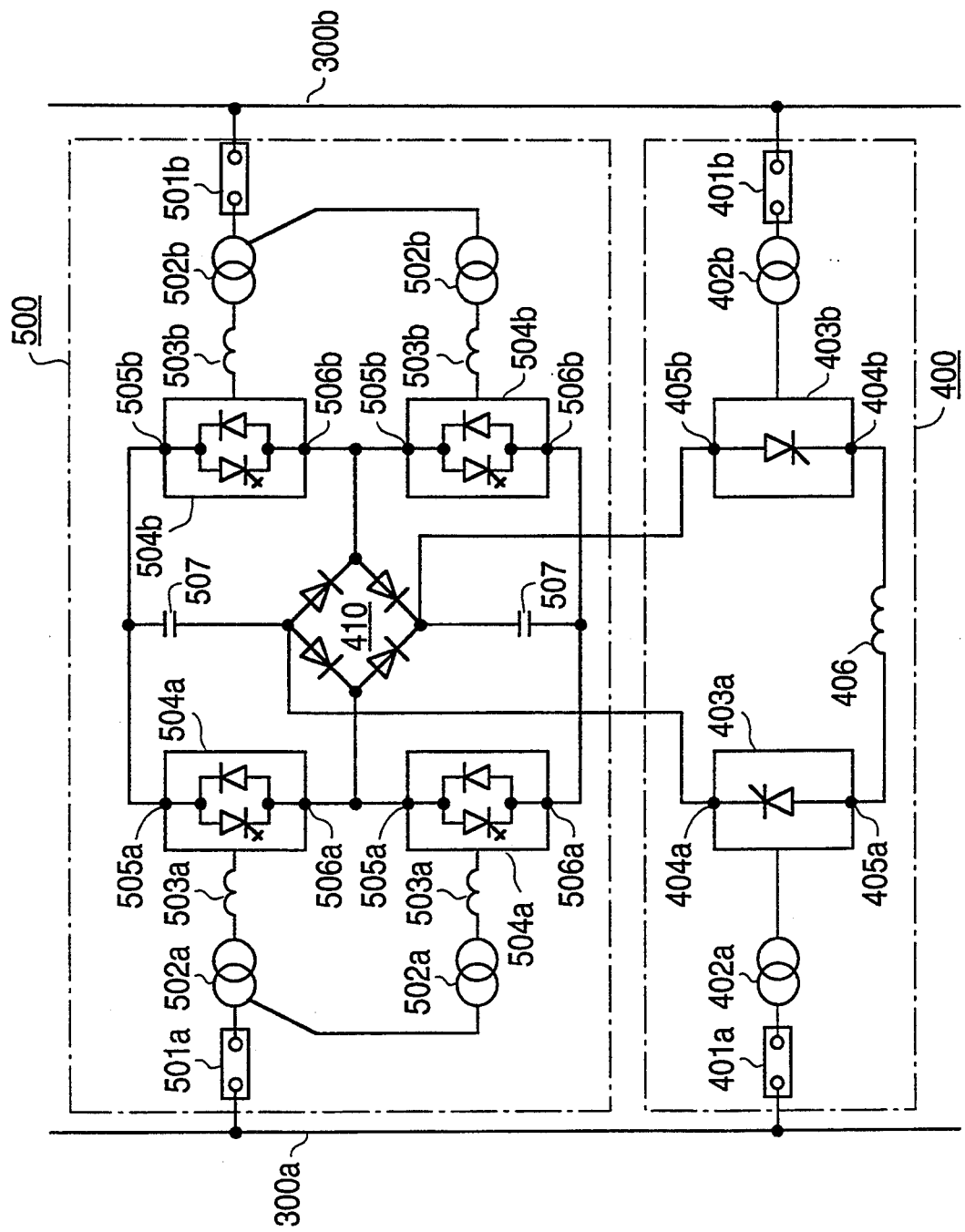
FIG. 15 is a diagram of a power conversion system illustrating a eleventh embodiment of the invention.

FIG. 15 shows an eleventh embodiment in which two self-commutated coupling systems as in FIG. 13 are employed. In this case also, the primaries of transformers 502 are connected in series.

In the above description, GTO thyristors are employed as reverse conducting type bridge connected power converter 504, but other devices could also be used.

Furthermore, apart from device-commutated power converters, impulse commutation or another self-commutated commutation type power converter could be employed.

In the embodiments of FIG. 11 to FIG. 15, the coupling diode or switching device is shown by a single symbol, but these could be appropriately used in series or parallel, depending on the voltage or current.

As described above, according to the eighth embodiment through the eleventh embodiment, the self-commutated power conversion apparatus reduces the reactive power and generation of higher harmonics, which are the weaknesses of the line-commutated power conversion apparatus and prevents commutation failure due to drop of system voltage and/or distortion. The line-commutated power conversion apparatus prevents overcurrent breakdown on short-circuiting, which is the weakness of the self-commutated power conversion apparatus.

In the embodiment of FIG. 1 to FIG. 15, the devices used in the coupling diode and the reverse conducting type bridge connected power converter have been represented by a single symbol, and these may be used in series, in parallel or in series and parallel, as appropriate, depending on the circuit voltage current. The line-commutated power conversion apparatus is not limited to a six-phase construction. It may be embodied as a twelve-phase or other multi-phase construction.

Thus benefits are exhibited which cannot be attained simply by arranging a line-commutated power conversion apparatus and self-commutated power conversion apparatus in parallel. Thus the embodiments offer great benefits in particular in contributing to the implementation of large self-commutated power conversion apparatuses.

What is claimed is:

1. A power conversion system comprising:
    line-commutated power converting means for converting from DC power to AC power or from AC power to DC power;
    self-commutated power converting means for reducing reactive power by the line-commutated power converting means; and
    a coupling means for forming a first closed circuit with the line-commutated power converting means and a second closed circuit with the self-commutated power converting means, wherein
    the line-commutated power converting means comprises a circuit breaker, a transformer, a reverse-blocking bridge connected power converter, and a DC reactor,
    the self-commutated power converting means comprises a circuit breaker, a transformer, a reverse-conducting bridge connected power converter, a reactor and a DC capacitor, the coupling means is a diode, the first closed circuit comprises a load, the diode, the DC reactor, and the reverse-blocking bridge connected power converter, and the second closed circuit comprises the DC capacitor, the diode, and the reverse-conducting bridge connected power converter.

2. A power conversion system comprising:

line-commutated power converting means for converting from DC power to AC power or from AC power to DC power;

self-commutated power converting means for reducing reactive power by the line-commutated power converting means; and a coupling means for forming a first closed circuit with the line-commutated power converting means and a second closed circuit with the self-commutated power converting means, wherein the line-commutated power converting means comprises a circuit breaker, a transformer, a reverse-blocking bridge connected power converter, and a DC reactor, the self-commutated power converting means comprises a circuit breaker, a transformer, a reverse-conducting bridge connected power converter, a reactor, and a DC capacitor, the coupling means is a diode, the first closed circuit comprises a DC power source, the diode, the DC reactor, and the reverse-blocking bridge connected power converter, and the second closed circuit comprises a DC power source, the diode, and the reverse-conducting bridge connected power converter.

3. A power conversion system comprising:

a pair of self-commutated power converters having AC terminals which are respectively connected to a first AC system and a second AC system and DC terminals, and being provided in common with a series circuit comprising a DC capacitor between the DC terminals and a coupling diode inserted with polarity such as to block the discharge current of the DC capacitor; and a pair of line-commutated power converters that perform line-commutated commutation, having AC terminals being respectively connected to the first AC system and second AC system, and which are connected such that the coupling diode is contained in series and such that DC current flows through the coupling diode.

4. A power conversion system comprising:

a pair of voltage type self-commutated converters that perform self-commutated commutation and have AC terminals being respectively connected to a first AC system and a second AC system and DC terminals, one end of a DC capacitor being connected to one end of the DC terminals of a coupling diode bridge, the other end of the coupling diode bridge being connected as DC terminals; and a pair of line-commutated converters that perform line-commutated commutation, have AC terminals being respectively connected to the first AC system and the second AC system, and are connected such that DC circuits are formed through the DC terminals of the coupling diode bridge and such that their DC currents flow through the coupling diode bridge.

* * * * *